(12) United States Patent
Glovier et al.

(10) Patent No.: US 12,714,000 B2
(45) Date of Patent: Aug. 25, 2026

(54) SYSTEM AND METHOD FOR DETECTING DISK PLUGGING ON AN AGRICULTURAL IMPLEMENT

(71) Applicant: CNH Industrial America LLC, New Holland, PA (US)

(72) Inventors: Scott Glovier, Lombard, IL (US); Joshua David Harmon, White Salmon, WA (US)

(73) Assignee: CNH Industrial America LLC, New Holland, PA (US)

( * ) Notice: Subject to any disclaimer, the term of this patent is extended or adjusted under 35 U.S.C. 154(b) by 439 days.

(21) Appl. No.: 18/109,483

(22) Filed: Feb. 14, 2023

(65) Prior Publication Data

US 2024/0268251 A1 Aug. 15, 2024

(51) Int. Cl.
*A01B 79/00* (2006.01)
*A01B 35/16* (2006.01)
*G01C 9/02* (2006.01)

(52) U.S. Cl.
CPC .............. *A01B 79/00* (2013.01); *A01B 35/16* (2013.01); *G01C 9/02* (2013.01)

(58) Field of Classification Search
CPC ......... A01B 79/00; A01B 35/16; A01B 21/08; G01C 9/02
See application file for complete search history.

(56) References Cited

U.S. PATENT DOCUMENTS

| | | | | |
|---|---|---|---|---|
| 4,508,178 | A | 4/1985 | Cowell et al. | |
| 4,932,476 | A | 6/1990 | Hoehn | |
| 6,612,381 | B2 | 9/2003 | Powell et al. | |
| 8,634,993 | B2 | 1/2014 | Mcclure et al. | |
| 9,609,800 | B2 * | 4/2017 | Henry | A01B 63/22 |
| 9,839,173 | B2 | 12/2017 | Henry | |
| 9,924,621 | B2 | 3/2018 | Sudbrink et al. | |
| 9,980,422 | B2 | 5/2018 | Czapka et al. | |
| 10,440,876 | B2 | 10/2019 | Sporrer et al. | |
| 10,561,052 | B2 | 2/2020 | Barrick et al. | |
| 10,752,237 | B2 | 8/2020 | Peterson et al. | |
| 2006/0021235 | A1 | 2/2006 | Becker | |
| 2008/0267719 | A1 | 10/2008 | Corcoran | |

(Continued)

FOREIGN PATENT DOCUMENTS

FR 2651957 A1 3/1991

*Primary Examiner* — Jelani A Smith
*Assistant Examiner* — Paul A Castro
(74) *Attorney, Agent, or Firm* — Dority & Manning, P.A.

(57) ABSTRACT

A tillage implement is a type of agricultural implement that includes a main implement frame and a disk frame adjustably coupled to the main implement frame, with the disk frame having a plurality of disk blades supported thereon. Furthermore, the tillage implement includes sensors configured to generate data indicative of an orientation of the main implement frame and the disk frame relative to a field surface. Furthermore, the tillage implement includes a computing system communicatively coupled to the sensors. In this respect, the computing system is configured to determine the orientation of the main implement frame and the disk frame relative to the field surface. Additionally, the computing system is configured to determine when the plurality of disk blades are plugged based on the determined orientation of the main implement frame and the disk frame relative to the field surface.

14 Claims, 7 Drawing Sheets

(56) References Cited

U.S. PATENT DOCUMENTS

| | | | | |
|---|---|---|---|---|
| 2014/0343813 | A1 * | 11/2014 | Morselli | B60T 13/686 180/14.1 |
| 2020/0053942 | A1 | 2/2020 | Kilby et al. | |
| 2020/0205336 | A1 * | 7/2020 | Boone | A01B 69/004 |
| 2021/0045278 | A1 * | 2/2021 | Henry | A01B 9/003 |
| 2021/0105942 | A1 * | 4/2021 | Paxinos | A01B 49/027 |

* cited by examiner

SYSTEM AND METHOD FOR DETECTING DISK PLUGGING ON AN AGRICULTURAL IMPLEMENT

FIELD OF THE INVENTION

The present disclosure generally relates to agricultural implements and, more particularly, to systems and methods for detecting disk plugging on an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. In general, tillage implements include ground-engaging tools, such as shanks, disk blades, and/or the like, supported on its frame. In certain configurations, tillage implements include a disk frame adjustably coupled to a main implement frame, and a plurality of disk blades supported on the disk frame. The plurality of disk blades are configured to rotate relative to the soil as the tillage implement travels across the field. The rotation of the disk blades loosens and/or otherwise agitates the soil to prepare the field for subsequent planting operations.

During tillage operations, field materials, such as residue, soil, rocks, and/or the like, may become trapped or otherwise accumulate between adjacent pairs of disk blades. When such accumulations of field materials become sufficient to prevent the plurality of disk blades from providing adequate tillage to the field (e.g., by slowing or preventing rotation of the disk blades), then the plurality of disk blades are plugged. In such instances, it is necessary for the operator to take certain corrective actions to remove the accumulated field materials. However, it may be difficult for the tillage implement operator to determine when the plurality of disk blades are plugged. In this respect, systems have been developed to detect plugging of disk blades during tillage operations. While such systems work well, further improvements are needed.

Accordingly, an improved system and method for detecting disk blade plugging on an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to an agricultural implement. The agricultural implement includes a main implement frame and a disk frame coupled to the main implement frame, with a plurality of disk blades supported on the disk frame. Furthermore, the agricultural implement includes a first sensor configured to generate data indicative of an orientation of the main implement frame relative to a field surface. Moreover, the agricultural implement includes a second sensor configured to generate data indicative of an orientation of the disk frame relative to the field surface. Additionally, the agricultural implement includes a computing system communicatively coupled to the first sensor configured to generate data indicative of an orientation of the main implement frame relative to a field surface and the second sensor configured to generate data indicative of an orientation of the disk frame relative to the field surface. In this respect, the computing system is configured to determine the orientation of the main implement frame relative to the field surface based on the data generated by the first sensor configured to generate data indicative of an orientation of the main implement frame relative to a field surface and determine the orientation of the disk frame relative to the field surface based on the data generated by the second sensor configured to generate data indicative of an orientation of the disk frame relative to the field surface. Additionally, the computing system is configured to determine a difference between the determined orientation of the main implement frame and the determined orientation of the disk frame. Moreover, the computing system is configured to determine that the plurality of disk blades are plugged when the difference between the orientation of the disk frame and the orientation of the main implement frame exceeds a predetermined threshold.

In another aspect, the present subject matter is directed to a system for detecting plugging of an agricultural implement. The system includes a main implement frame, a disk frame adjustably coupled to the main implement frame, and a plurality of disk blades supported on the main disk frame. In addition, the system includes a first sensor configured to generate data indicative of an orientation of the main implement frame relative to a field surface and a second sensor configured to generate data indicative of an orientation of the disk frame relative to the field surface. Moreover, the system includes a computing system communicatively coupled to the first sensor and the second sensor. In this respect, the computing system is configured to determine the orientation of the main implement frame relative to the field surface based on the data generated by the first sensor and determine the orientation of the disk frame relative to the field surface based on the data generated by the second sensor. Furthermore, the computing system is configured to determine when the plurality of disk blades are plugged based on the determined orientation of the main implement frame relative to the field surface and the determined orientation of the disk frame relative to the field surface.

In a further aspect, the present subject matter is directed to a method for detecting plugging of an agricultural implement. The method includes receiving, with a computing system, first sensor data indicative of an orientation of a main implement frame relative to a field surface and receiving, with the computing system, second sensor data indicative of an orientation of a disk frame relative to a field surface. Moreover, the method includes determining, with the computing system, the orientation of the main implement frame relative to the field surface based on the data generated by the first sensor and determining, with the computing system, the orientation of the disk frame relative to the field surface based on the data generated by the second sensor. In addition, the method includes determining, with the computing system, when a plurality of disk blades supported on the disk frame are plugged based on the determined orientation of the main implement frame relative to the field surface and the determined orientation of the disk frame relative to the field surface.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
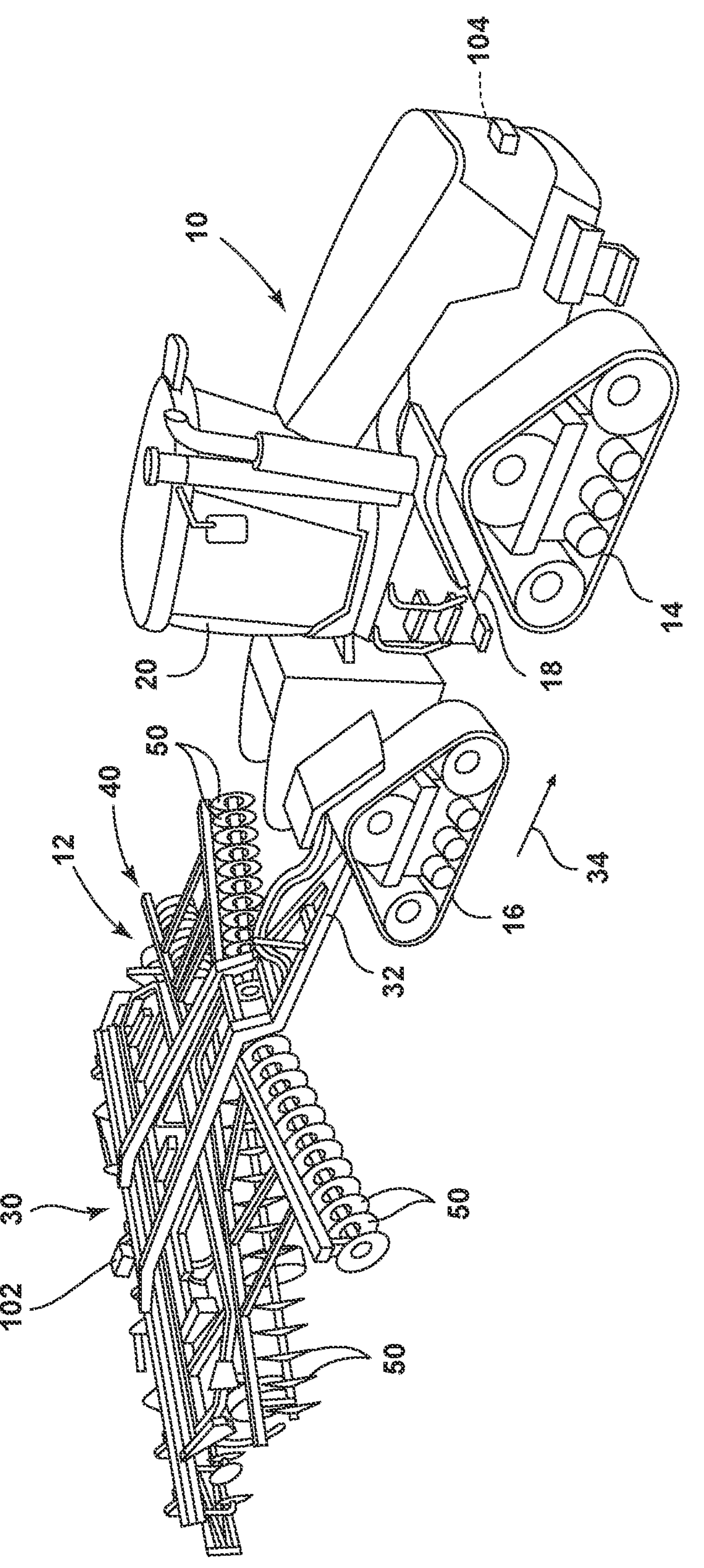
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield still a further embodiment. Thus, it is intended that the present invention covers such modifications and variations as come within the scope of the appended claims and their equivalents.

In general, the present subject matter is directed to a system and a method for detecting disk blade plugging on an agricultural implement. As will be described below, the agricultural implement generally includes a disk frame adjustably coupled to a main implement frame and a plurality of disk blades supported on the disk frame. In this respect, as the agricultural implement travels across a field, the disk blades are configured to rotate relative to the soil such that a tillage operation is performed on the field. During operation, field materials (e.g., soil, residue, etc.) may accumulate on the disk blade(s). When a sufficient amount of field materials accumulates on the disk blades, the operation of such disk blades may be impacted. In such instances, the disk blades are considered plugged.

In several embodiments, a computing system of the disclosed system is configured to detect plugging of the disk blades based on the orientations of the main implement frame and the disk frame. More specifically, the computing system is configured to receive first sensor data indicative of the orientation of the main implement frame relative to the field surface. In this respect, the computing system is configured to determine the orientation of the main implement frame relative to the field surface based on the received first sensor data. Moreover, the computing system is configured to receive second sensor data indicative of the orientation of the disk frame relative to the field surface. As such, the computing system is configured to determine the orientation of the disk frame relative to the field surface based on the received second sensor data. Additionally, in some embodiments, the computing system may determine the difference between the determined orientation of the main implement frame and the determined orientation of the disk frame. Thereafter, the computing system may determine that one or more of the disk blades are plugged when the difference between the orientation of the disk frame and the orientation of the main implement frame exceeds a predetermined threshold.

Using the orientations of the main implement frame and the disk frame to determine when one or more of the disk blades of an agricultural implement are plugged improves the operation of the implement. More specifically, as the disk blades start to plug, the disk frame rotates relative to the field surface. Such rotation may be about a rotational axis oriented in the direction of travel and/or a rotational axis oriented perpendicular to the direction of travel of the agricultural implement. However, the main implement frame does not rotate relative to the field surface when the disk blades begin to plug. Thus, by comparing the orientations of the main implement frame and the disk frame, the disclosed system and method can accurately detections of disk blade plugging on the agricultural implement.

Figure 2:
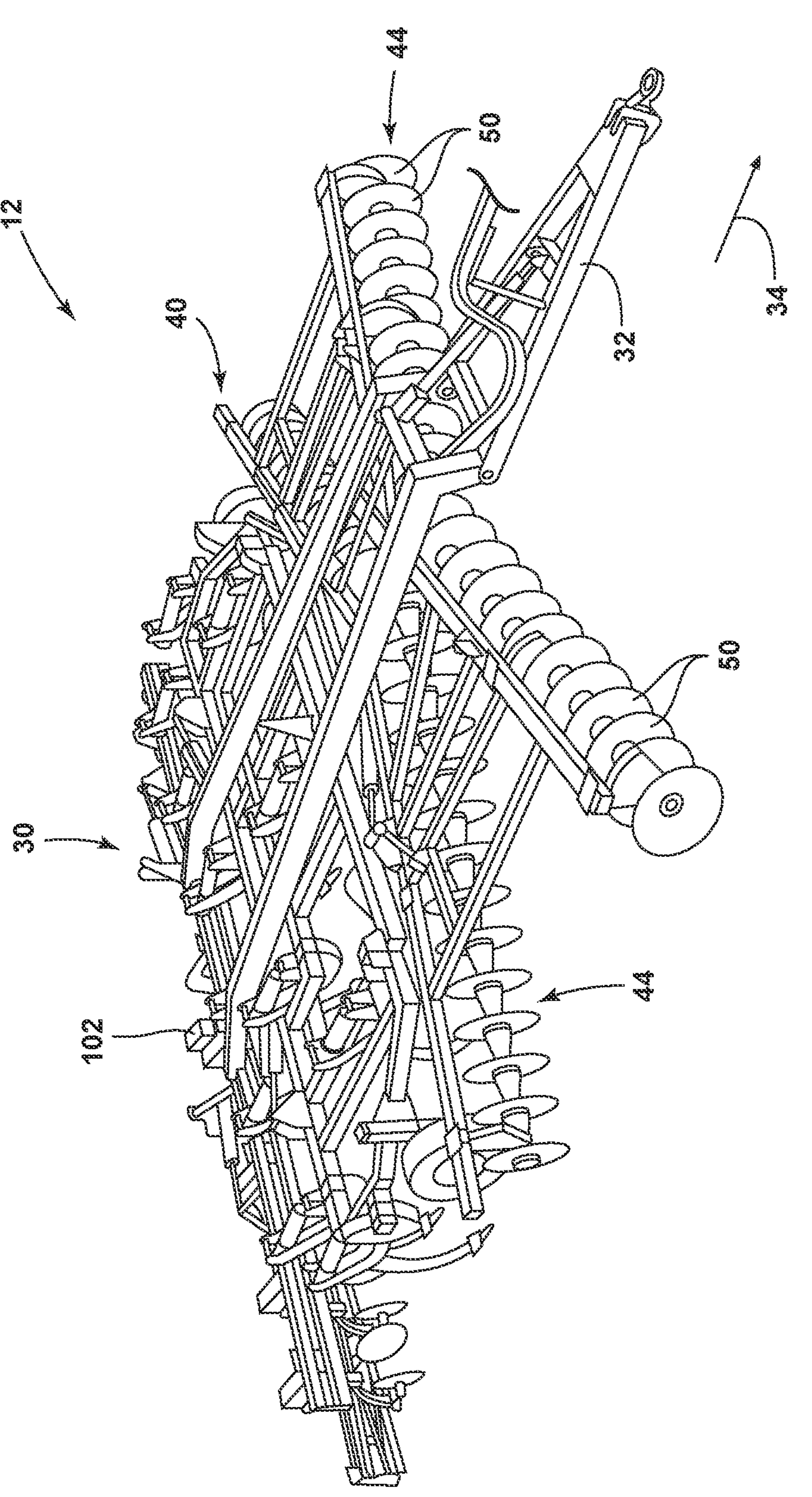
FIG. 2 illustrates a perspective view of the agricultural implement shown in FIG. 1.

Referring now to drawings, FIGS. 1 and 2 illustrate perspective views of one embodiment of a work vehicle 10 and an associated agricultural implement 12 in accordance with aspects of the present subject matter. Specifically, FIG. 1 illustrates a perspective view of the work vehicle 10 towing the agricultural implement 12 across a field in a travel direction (e.g., as indicated by arrow 34). Additionally, FIG. 2 illustrates a perspective view of the agricultural implement 12 shown in FIG. 1.

As shown in the illustrated embodiment, the work vehicle 10 is configured as an agricultural tractor and the agricultural implement 12 is configured as a tillage implement. However, in other embodiments, the work vehicle 10 may be configured as any other suitable agricultural or other type of work vehicle. Similarly, in other embodiments, the agricultural implement 12 may be configured as any other suitable agricultural implement configured to be towed by a work vehicle.

As particularly shown in FIG. 1, the work vehicle 10 includes a pair of front track assemblies 14, a pair or rear track assemblies 16, and a frame or chassis 18 coupled to and supported by the track assemblies 14, 16. An operator's cab 20 may be supported by a portion of the chassis 18 and may house various input devices for permitting an operator to control the operation of one or more components of the work vehicle 10 and/or one or more components of the implement 12. Additionally, the work vehicle 10 may include an engine 22 (FIG. 5) and a transmission 24 (FIG. 5) mounted on the chassis 18. The transmission 24 may be operably coupled to the engine 22 and may provide variably adjusted gear ratios for transferring engine power to the track assemblies 14, 16 via a drive axle assembly (not shown) (or via axles if multiple drive axles are employed).

Additionally, as shown in FIGS. 1 and 2, the implement 12 may generally include a main implement frame 30. As such, the main implement frame 30 may be coupled to the work vehicle 10 via a pull hitch or tow bar 32. Moreover, a plurality ground-engaging tools, such as a plurality of shanks, leveling blades, basket assemblies, tines, spikes, and/or the like, are supported on the main implement frame 30. For example, in the illustrated embodiment, a disk frame 40 is supported on the main implement frame 30. The disk frame 40, in turn, includes a plurality of disk blades 50, such as various gang assemblies 44 of the disk blades 50, supported thereon. In this respect, the disk blades 50 are configured to rotate relative to the soil as the implement 12 is being towed across the field. However, in other embodiments, any other ground-engaging tool frames may be supported on the main implement frame 30.

Figure 3:
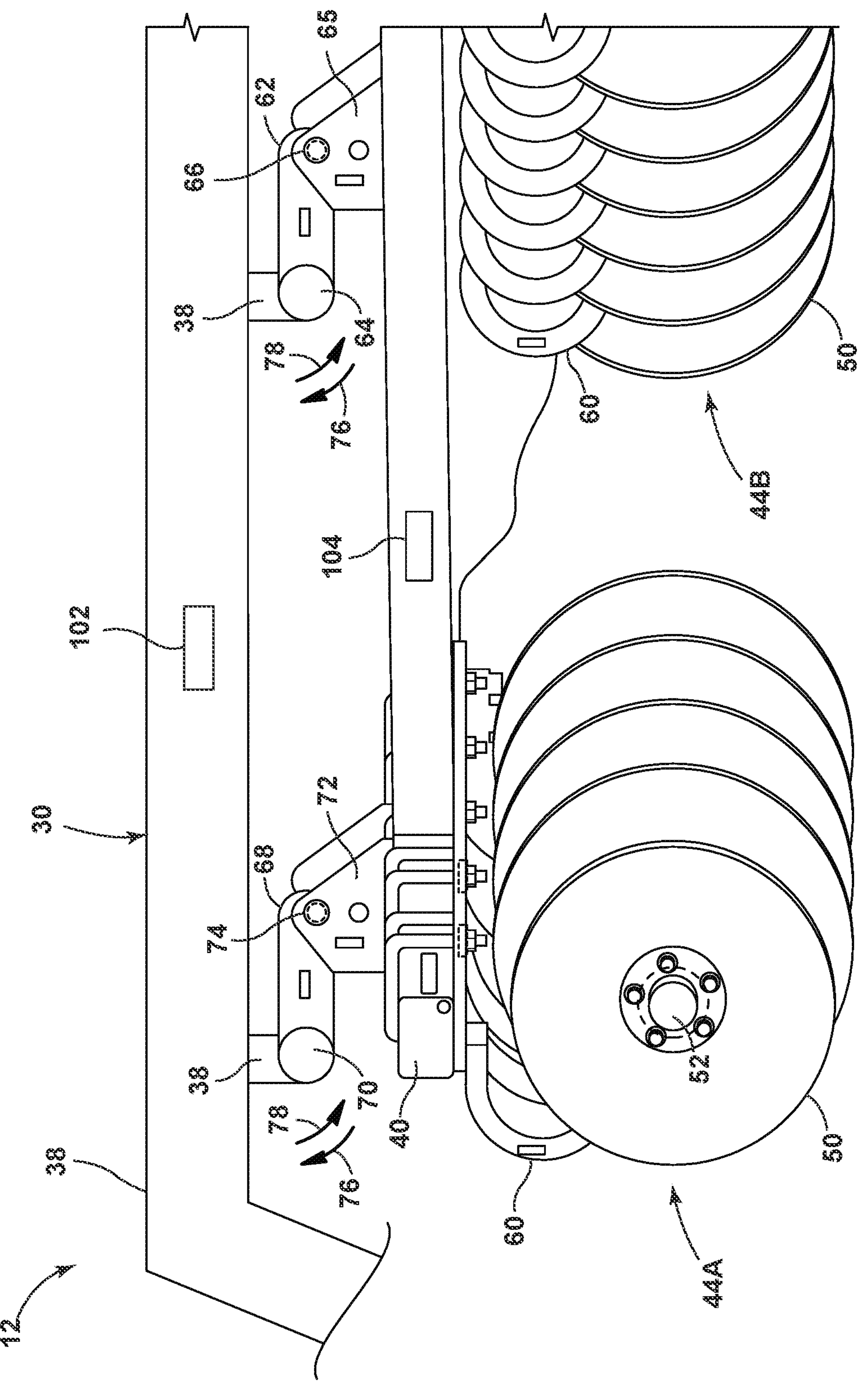
FIG. 3 illustrates a partial side view of the agricultural implement shown in FIGS. 1 and 2, particularly illustrating a disk frame of the implement coupled to a main frame of the implement.

Referring now to FIG. 3, a partial side view of the agricultural implement 12 is illustrated in accordance with aspects of the present subject matter. More specifically, FIG. 3 illustrates a side view of portions of front and rear disk gang assemblies 44A, 44B of the agricultural implement 12. For example, in the illustrated embodiment, each disk gang assembly 44A, 44B may include a plurality of disk blades 50 ganged together along a disk gang shaft 52, which is, in turn, supported relative to the disk frame 40 via a plurality of hangers 60 (e.g., C-hangers).

Moreover, as mentioned above, the disk frame 40 is adjustably coupled to the main implement frame 30. For instance, as shown in FIG. 3, a forward end of the disk frame 40 is coupled to an adjacent frame member 38 of the main implement frame 30 via a front support arm 62 and a front rockshaft 64 of the agricultural implement 12. Specifically, a first end of the forward support arm 62 is coupled to a corresponding gang bracket 65 (e.g., via a bolt or pin 66), which is, in turn, coupled to a portion of the disk frame 40. Additionally, an opposed, second end of the forward support arm 62 is coupled to the front rockshaft 64, which is, in turn, rotatably coupled to an adjacent frame member 38 of the main implement frame 30. Similarly, as shown in FIG. 3, a rear end of the disk frame 40 is coupled to the adjacent frame member 38 of the main implement frame 30 via a rear support arm 68 and a rear rockshaft 70 of the agricultural implement 12. Specifically, a first end of the rear support arm 68 is coupled to a corresponding gang bracket 72 (e.g., via a bolt or pin 74), which is, in turn, coupled to a portion of the disk frame 40. Additionally, an opposed, second end of the rear support arm 68 is coupled to the rear rockshaft 70, which is, in turn, rotatably coupled to the adjacent frame member 38 of the main implement frame 30.

In several embodiments, rotation of each rockshaft 64, 70 in a first direction (e.g., as indicated by arrow 76 in FIG. 3) adjusts the position of the disk gang assemblies 44 relative to the main implement frame 30 such that the penetration depth of the disk blades 50 is decreased. Similarly, rotation of each rockshaft 64, 70 in an opposite, second direction (e.g., as indicated by arrow 78 in FIG. 3) adjusts the position of the disk gang assemblies 44 relative to the main implement frame 30 such that the penetration depth of the disk blades 50 is increased.

The configuration of the work vehicle 10 described above and shown in FIG. 1 is provided only to place the present subject matter in an exemplary field of use. Thus, the present subject matter may be readily adaptable to any manner of work vehicle configuration.

Additionally, the configuration of the agricultural implement 12 described above and shown in FIGS. 1 and 2 is only provided for exemplary purposes. Thus, the present subject matter may be readily adaptable to any manner of implement configuration. For example, the agricultural implement 12 may be configured as a planting implement, a fertilizing implement, and/or any other suitable type of agricultural implement.

Moreover, the work vehicle 10 (FIG. 1) and/or the agricultural implement 12 may include one or more first sensors 102. Specifically, as shown in FIG. 3, the first sensor(s) 102 may be in operative association with the agricultural implement 12 such that the first sensor(s) 102 may capture data indicative of the orientation (e.g., height, angle, etc.) of the main implement frame 30 relative to a field surface. The first sensor(s) 102 may also or alternatively be in operative association with the work vehicle 10 (FIG. 1) such that the first sensor(s) 102 may capture data of the orientation (e.g., angle, height, etc.) of the main implement frame 30 relative to a field surface. In this respect, as the vehicle/implement 10/12 travels across the field, the first sensor 102 is configured to generate data indicative of the orientation of the main implement frame 30 relative to the field surface.

The first sensor(s) 102 may be mounted at any suitable location on the work vehicle 10 and/or the agricultural implement 12 that allows the first sensor(s) 102 to generate sensor data indicative of the orientation of the main implement frame 30 relative to the field surface. For example, in the illustrated embodiment, one first sensor 102 is mounted on the forward end of the main implement frame 30 of the agricultural implement 12. However, in alternative embodiments, the work vehicle 10 and/or the agricultural implement 12 may include any other suitable number of first sensors 102.

Additionally, the agricultural implement 12 may include one or more second sensors 104 coupled thereto and/or supported thereon. Specifically, as shown in FIG. 3, the second sensor(s) 104 may be in operative association with the implement 12 such that the second sensor(s) 104 may capture data indicative of the orientation (e.g., angle, height, etc.) of the disk frame 40 relative to the field surface. Thus, as the vehicle/implement 10/12 travels across the field, the second sensor(s) 104 is configured to generate data indicative of the orientation of the disk frame 40 relative to the field surface. As will be described below, the data generated by the first and second sensors 102, 104 is used to detect when one or more of the disk blades 50 of the implement 12 are plugged.

The second sensor(s) 104 may be mounted at any suitable location on the work vehicle 10 or the agricultural implement 12 that allows the second sensor(s) 104 to generate sensor data indicative of the orientation of the disk frame 40 relative to the field surface. For example, in the illustrated embodiment, the second sensor 104(*s*) is mounted on the forward end of the disk frame 40. However, in alternative embodiments, the agricultural implement 12 may include any other suitable number of second sensors 104.

In general, the first and second sensors 102, 104 may correspond to any suitable sensing devices configured to generate data of the orientation (e.g., angle, height, etc.) of the main implement frame and the disk frame relative to one or more reference points (e.g., the field surface). For instance, in several embodiments, the first and second sensors 102, 104 may correspond to inclinometers, such as a single axis inclinometer, a two-axis inclinometer, or a three-axis inclinometer. For instance, in one embodiment, the sensors 102, 104 may be configured to measure fore-to-aft inclination (e.g., pitch angle) of the main implement frame 30 and the disk frame 40 in the travel direction of the vehicle 34 (FIG. 1) and/or the side-to-side inclination (e.g., the roll angle) of the main implement frame 30 and the disk frame 40 in a side-to-side direction extending perpendicular to the travel direction of the vehicle 34. In other embodiments, the sensors 102, 104 may correspond to any other suitable sensor(s) or sensing device(s) that may provide an indication of the angle of inclination of the main implement frame 30 and the disk frame 40, such as gyroscopes, accelerometers, height sensors (e.g., radar or sonar sensors), and/or the like.

Figure 4B:
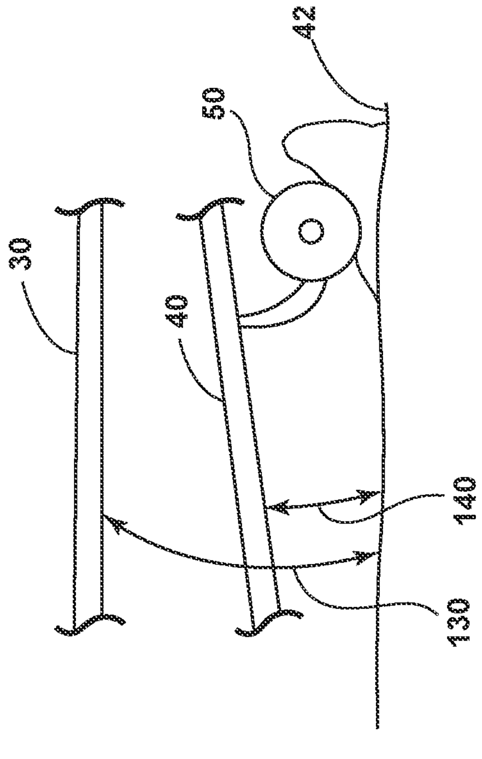
FIG. 4B illustrates another simplified partial side view of the agricultural implement shown in FIGS. 1-3, particularly illustrating the orientation of the disk frame and the orientation of the main frame of the implement when the disk blades are plugged.
Figure 4A:
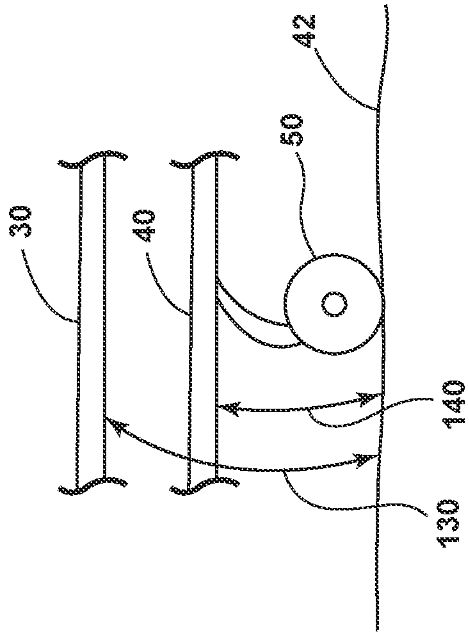
FIG. 4A illustrates a simplified partial side view of the agricultural implement shown in FIGS. 1-3, particularly illustrating the orientation of the disk frame and the orientation of the main frame of the implement when the disk blades are not plugged.

Referring now to FIG. 4A, a simplified partial side view of the agricultural implement 10 is shown. In particular, FIG. 4 illustrates the orientation of the disk frame 40 and the orientation of the main frame 30 of the implement 12 when the disk blades 50 are experiencing not experiencing plugging. As shown in FIG. 4A, the main implement frame 30 defines an orientation angle 130 indicative of the orientation of the main implement frame 30 relative to a field surface 42. Likewise, the disk frame 40 defines an orientation angle 140 indicative of the orientation of the disk frame 40 relative to the field surface 42. When the disk blades 50 are not experiencing plugging, the orientation angle 130 of the main implement frame 30 and the orientation angle 140 of the disk frame 40 are similar such that the difference therebetween does not exceed a predetermined threshold.

Conversely, as shown in FIG. 4B, when the disk blades 50 are experiencing plugging, the difference between the orientation angle 130 of the main implement frame 30 and the orientation angle 140 of the disk frame 40 will be large such that the difference exceeds a predetermined threshold. Specifically, the materials plugging the disk blades 50 generally accumulate in front of the disk blades, thereby causing the disk blades 50 to lift up relative to the main implement frame 30. Such lifting of the disk blades 50 may, in turn, cause the disk frame 40 to and/or or roll relative to the main implement frame 30 such that the orientation angle 130 of the main implement frame 30 and the orientation angle 140 of the disk frame 40 differ by more than the predetermined amount. In the illustrated instance, the disk blades 50 of a forward end of the disk frame 40 are experiencing plugging. As such, the forward end of the disk frame 40 has moved upward toward the main implement frame 30 such that the difference between the orientation angle 130 of the main implement frame 30 and the orientation angle 140 of the disk frame 40 exceeds the predetermined threshold.

In both instances illustrated in of FIGS. 4A and 4B, the orientation of the main implement frame 30 is level relative to the field surface 42. Additionally, in FIG. 4A, the orientation of the disk frame 40 is level relative to the field surface 42 in the illustrated instance when the disk blades 50 are not experiencing plugging. Furthermore, in FIG. 4B, the forward end of the disk frame 40 is elevated above the field surface 42 such that the orientation of the disk frame 40 is not level relative to the field surface 42 in the illustrated instance when the disk blades 50 are experiencing plugging. However, in other instances, an aft end of the disk frame 40 or any other portion of the disk frame 40 and/or the main implement frame 30 may be oriented at a position that is level or not level relative to the field surface 42 when the disk blades 50 are experiencing plugging. For example, in some instances, the main implement frame 30 and the disk frame 40 may encounter inclines, declines, divots, trenches, or other surface irregularities encountered by the vehicle 10 and/or the agricultural implement 12.

Figure 5:
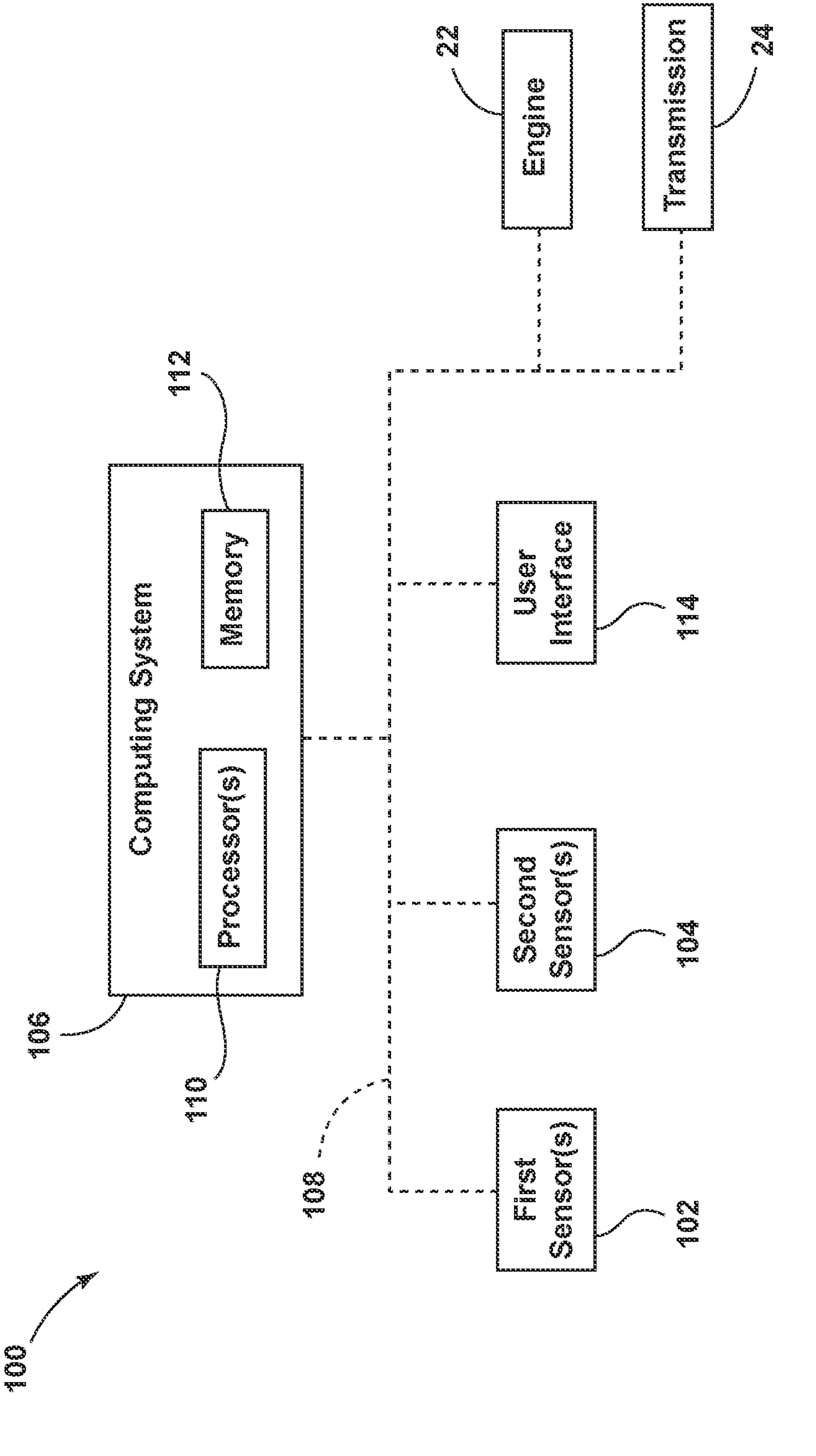
FIG. 5 illustrates a schematic view of one embodiment of a system for detecting disk blade plugging on an agricultural implement in accordance with aspects of the present subject matter.

Referring now to FIG. 5, a schematic view of one embodiment of a system 100 for detecting disk blade plugging on an agricultural implement is illustrated in accordance with aspects of the present subject matter. In general, the system 100 will be described herein with reference to the work vehicle 10 and the agricultural implement 12 described above with reference to FIGS. 1-3. However, it should be appreciated by those of ordinary skill in the art that the disclosed system 100 may generally be utilized with work vehicles having any other suitable vehicle configuration and/or agricultural implements having any other suitable implement configuration.

As shown in FIG. 5, the system includes one or more components of the work vehicle 10 and/or the agricultural implement 12. For example, in the illustrated embodiment, the system 100 includes the first sensor(s) 102, the second sensor(s) 104, the engine 22, and the transmission 24. However, in alternative embodiments, the system 100 may include any other suitable components of the work vehicle 10 and/or the agricultural implement 12 in addition to or in lieu of the aforementioned components.

Moreover, the system 100 includes a computing system 106 communicatively coupled to one or more components of the work vehicle 10, the agricultural implement 12, and/or the system 100 to allow the operation of such components to be electronically or automatically controlled by the computing system 106. For instance, the computing system 106 may be communicatively coupled to the first and second sensors 102, 104 via a communicative link 108. As such, the computing system 106 may be configured to receive data from the first and second sensors 102, 104 that is indicative of the orientations of the main implement frame 30 and the disk frame 40 relative to the field surface. Furthermore, the computing system 106 may be communicatively coupled to the engine 22 and/or the transmission 24 via the communicative link 108. As such, the computing system 106 may be configured to control the operation of the engine 22 and/or the transmission 24 to adjust the ground speed of the vehicle/implement 10/12. In addition, the computing system 106 may be communicatively coupled to any other suitable components of the work vehicle 10, the agricultural implement 12, and/or the system 100.

In general, the computing system 106 may comprise one or more processor-based devices, such as a given controller or computing device or any suitable combination of controllers or computing devices. Thus, in several embodiments, the computing system 106 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 112 of the computing system 106 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 112 may generally be configured to store suitable computer-readable instructions that, when implemented by the processor(s) 110, configure the computing system 106 to perform various computer-implemented functions, such as one or more aspects of the methods and algorithms that will be described herein. In addition, the computing system 106 may also include various other suitable components, such as a communications circuit or module, one or more input/output channels, a data/control bus and/or the like.

The various functions of the computing system 106 may be performed by a single processor-based device or may be distributed across any number of processor-based devices, in which instance such devices may be considered to form part of the computing system 106. For instance, the functions of the computing system 106 may be distributed across multiple application-specific controllers or computing devices, such as a navigation controller, an engine controller, a transmission controller, an implement controller, and/or the like.

Furthermore, the system 100 may also include a user interface 114. More specifically, the user interface 114 may be configured to receive inputs (e.g., inputs associated with operation of the tillage implement) from the operator. As such, the user interface 114 may include one or more input devices, such as touchscreens, keypads, touchpads, knobs, buttons, sliders, switches, mice, microphones, and/or the like, which are configured to receive inputs from the operator. The user interface 114 may, in turn, be communicatively coupled to the computing system 106 via the communicative link 108 to permit the received inputs to be transmitted from the user interface 114 to the computing system 106. In addition, some embodiments of the user interface 114 may include one or more feedback devices (not shown), such as display screens, speakers, warning lights, and/or the like, which are configured to provide feedback from the computing system 106 to the operator. In one embodiment, the user interface 114 may be mounted or otherwise positioned within the cab 20 of the work vehicle_10. However, in alternative embodiments, the user interface 114 may mounted at any other suitable location.

Figure 6:
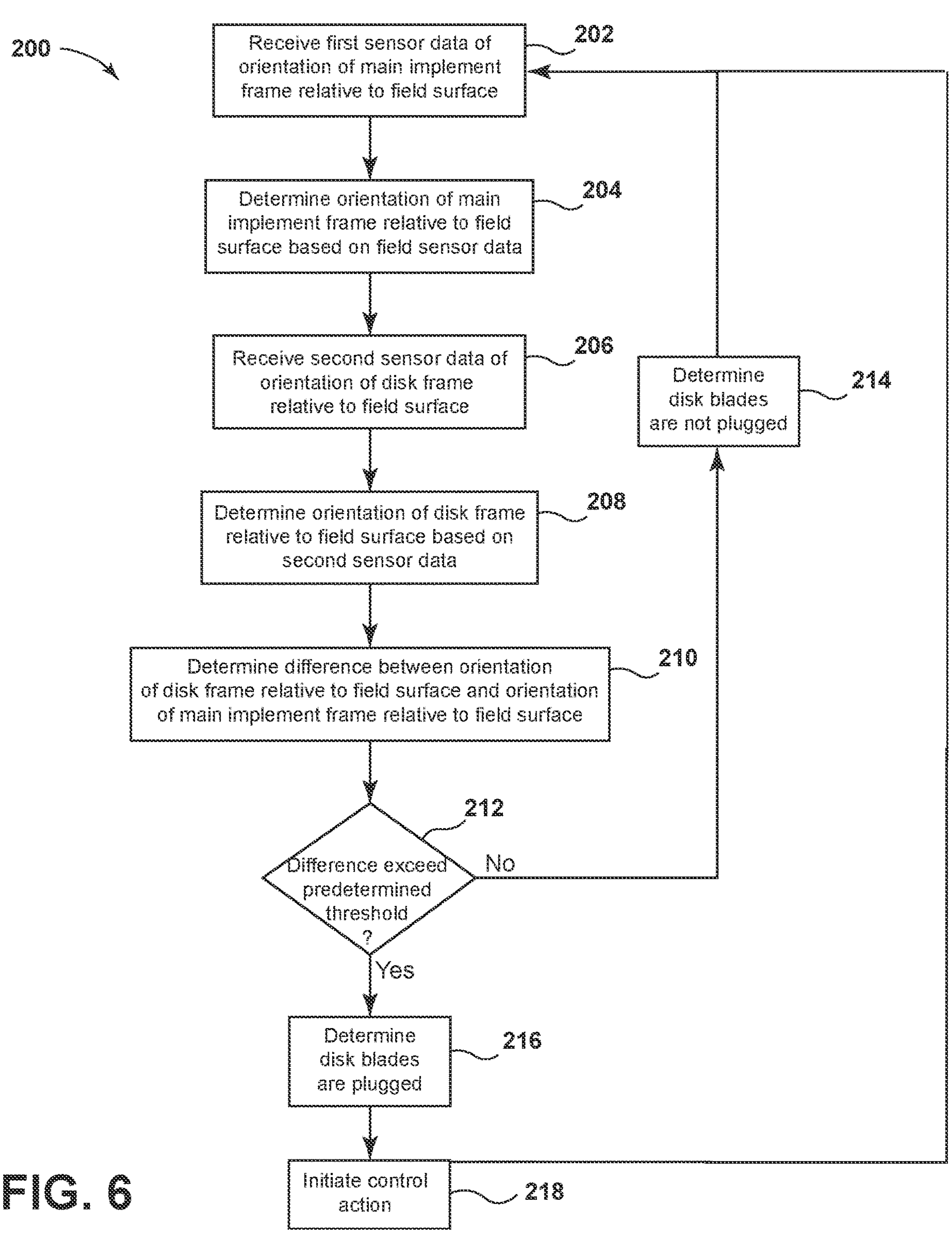
FIG. 6 illustrates a flow diagram providing one embodiment of control logic for detecting disk blade plugging on an agricultural implement in accordance with aspects of the present subject matter.

Referring now to FIG. 6, a flow diagram of one embodiment of example control logic 200 that may be executed by the computing system (or any other suitable computing system) for detecting disk blade plugging on an agricultural implement is illustrated in accordance with aspects of the present subject matter. Specifically, the control logic 200 shown in FIG. 6 is representative of steps of one embodiment of an algorithm that can be executed to detect disk blade plugging on an agricultural implement with improved accuracy and less false positive plugging determinations. Thus, in several embodiments, the control logic 200 may be advantageously utilized in association with a system installed on or forming part of a work vehicle and/or an agricultural implement to allow for real-time control of detection of disk blade plugging without requiring substantial computing resources and/or processing time. However, in other embodiments, the control logic 200 may be used in association with any other suitable system, application, and/or the like for detecting disk blade plugging on an agricultural implement.

As shown, at (202), the control logic 200 includes receiving first sensor data indicative of the orientation of a main implement frame of an agricultural implement relative to a field surface. Specifically, as mentioned above, in several embodiments, the computing system 106 may be communicatively coupled to the first sensor(s) 102 via the communicative link 108. In this respect, as the vehicle/implement 10/12 travels across the field to perform an agricultural operation (e.g., a tillage operation) thereon, the computing system 106 may receive first sensor data from the first sensor(s) 102. Such data is, in turn, indicative of the orientation of the main implement frame 30 of the agricultural implement 12 relative to the field surface. For instance, in some embodiments, the received first sensor data may be indicative of the fore-to-aft inclination (e.g., pitch angle) of the main implement frame 30. Alternatively, or additionally, the received first sensor data may indicative of the side-to-side inclination (e.g., the roll angle) of the main implement frame 30 in a side-to-side direction extending perpendicular to the travel direction of the vehicle 34.

Furthermore, at (204), the control logic 200 includes determining the orientation of the main implement frame relative to the field surface based on the received first sensor data. Specifically, in several embodiments, the computing system 106 is configured to analyze the first sensor data received at (202) to determine the orientation of the main implement frame 30 relative to the field surface. For instance, when determining the orientation of the main implement frame relative to the field surface, the computing system 106 may be configured to determine the fore-to-aft inclination (e.g., pitch angle) of the main implement frame 30 and/or the side-to-side inclination (e.g., the roll angle) of the main implement frame 30 in the side-to-side direction based on the received first sensor data. As such, the computing system 106 may include a look-up table, suitable mathematical formula, and/or algorithms stored within its memory device(s) 112 that correlates the received first sensor data to the orientation of the main implement frame 30.

Additionally, at (206), the control logic 200 includes receiving second sensor data indicative of the orientation of a disk frame of the agricultural implement relative to the field surface. Specifically, as mentioned above, in several embodiments, the computing system 106 may be communicatively coupled to the second sensor(s) 104 via the communicative link 108. In this respect, as the vehicle/implement 10/12 travels across the field to perform an agricultural operation (e.g., a tillage operation) thereon, the computing system 106 may receive second sensor data from the second sensor(s) 104. Such data is, in turn, indicative of the orientation of the disk frame 40 of the agricultural implement 12 relative to the field surface. For instance, in some embodiments, the received second sensor data may be indicative of the fore-to-aft inclination (e.g., pitch angle) of the disk frame 40. Alternatively, or additionally, the received second sensor data may be indicative of the side-to-side inclination (e.g., the roll angle) of the disk frame 40 in a side-to-side direction extending perpendicular to the travel direction of the vehicle 34.

Moreover, at (208), the control logic 200 includes determining the orientation of the disk frame relative to the field surface based on the received second sensor data. Specifically, in several embodiments, the computing system 106 is configured to analyze the second sensor data received at (206) to determine the orientation of the disk frame 40 relative to the field surface. For instance, when determining the orientation of the disk frame relative to the field surface, the computing system 106 may be configured to determine the fore-to-aft inclination (e.g., pitch angle) of the disk frame 40 and/or the side-to-side inclination (e.g., the roll angle) of the disk frame 40 in the side-to-side direction based on the received second sensor data. As such, the computing system 106 may include a look-up table, suitable mathematical formula, and/or algorithms stored within its memory device (s) 112 that correlates the received second sensor data to the orientation of the disk frame 40. In some embodiments, (206) and (208) may be performed before (202) and (204).

In other embodiments, (206) and (208) may be performed in parallel with (202) and (204) As will be described below, the orientations of the main implement frame 30 and the disk frame 40 are used to determine when one or more of the disk blades 50 are plugged.

In addition, at (210), the control logic 200 includes determining the difference between the orientation of the disk frame relative to the field surface and the orientation of the main implement frame relative to the field surface. More specifically, when the disk gangs are not plugged, the orientations of the main implement frame 30 and the disk frame 40 are generally similar. However, when the disk gangs begin to plug, the accumulation of field materials between the disk blades 50 may cause the corresponding disk blades 50 to lift up. Such lifting of the disk blades 50, in turn, causes the disk frame 40 to move relative to the main implement frame 30 such that that disk frame 40 is pitched and/or rolled. In such instances, the orientations of the main implement frame 30 and the disk frame 40 differ. As such, in several embodiments, the computing system 106 is configured to determine the difference between the orientation of the main implement frame 30 determined at (204) and the orientation of the disk frame 40 determined at (208).

Furthermore, at (212), the control logic 200 includes determining whether the difference between the orientation of the disk frame relative to the field surface and the orientation of the main implement frame relative to the field surface determined at (210) exceeds a predetermined threshold. In this respect, when the orientations of the main implement frame 30 and the disk frame 40 differ by more than a threshold amount, the control logic 200 proceeds to (216) wherein the computing system 106 determines that the one or more the disk blades 50 are plugged. In such instances, the control logic 200 proceeds to (218). Conversely, when the orientations of the main implement frame 30 and the disk frame 40 differ by less than the threshold amount, the control logic 200 proceeds to (214) wherein the computing system 106 determines that the one or more the disk blades 50 are not plugged. In such instances, the control logic 200 returns to (202).

Additionally, at (218), the control logic 200 includes initiating one or more control actions associated with notifying an operator that the disk blades are plugged and/or adjusting a ground speed of the work vehicle 10. Specifically, when it determined that one or more of the disk blades 50 are plugged, the computing system 106 may initiate one or more control actions associated with notifying the operator and/or adjusting the ground speed of the work vehicle 10. For example, in some embodiments, the computing system 106 may transmit signals to the user interface 114. Such signals, in turn, instruct the user interface 114 to provide an visual and/or audible notification to the operator indicating that one or more of the disk blades 50 are plugged. Additionally, or as an alternative, the control action(s) may include adjusting the ground speed of the vehicle/implement 10/12. In such embodiments, the computing system 106 may transmit control signals to the engine 22 and/or the transmission 24 via the communicative link 116. Such control signals may, in turn, instruct the engine 22 and/or the transmission 24 to adjust the ground speed of the vehicle/implement 10/12. However, in alternative embodiments, the computing system 106 may be configured to initiate any other suitable control actions in addition to or in lieu of notifying the operator or adjusting the ground speed of the work vehicle 10. Furthermore, once the control logic 200 has initiated one or more control actions associated with notifying an operator that the disk blades are plugged and/or adjusting a ground speed of the work vehicle 10, the control logic proceeds back to (202).

Figure 7:
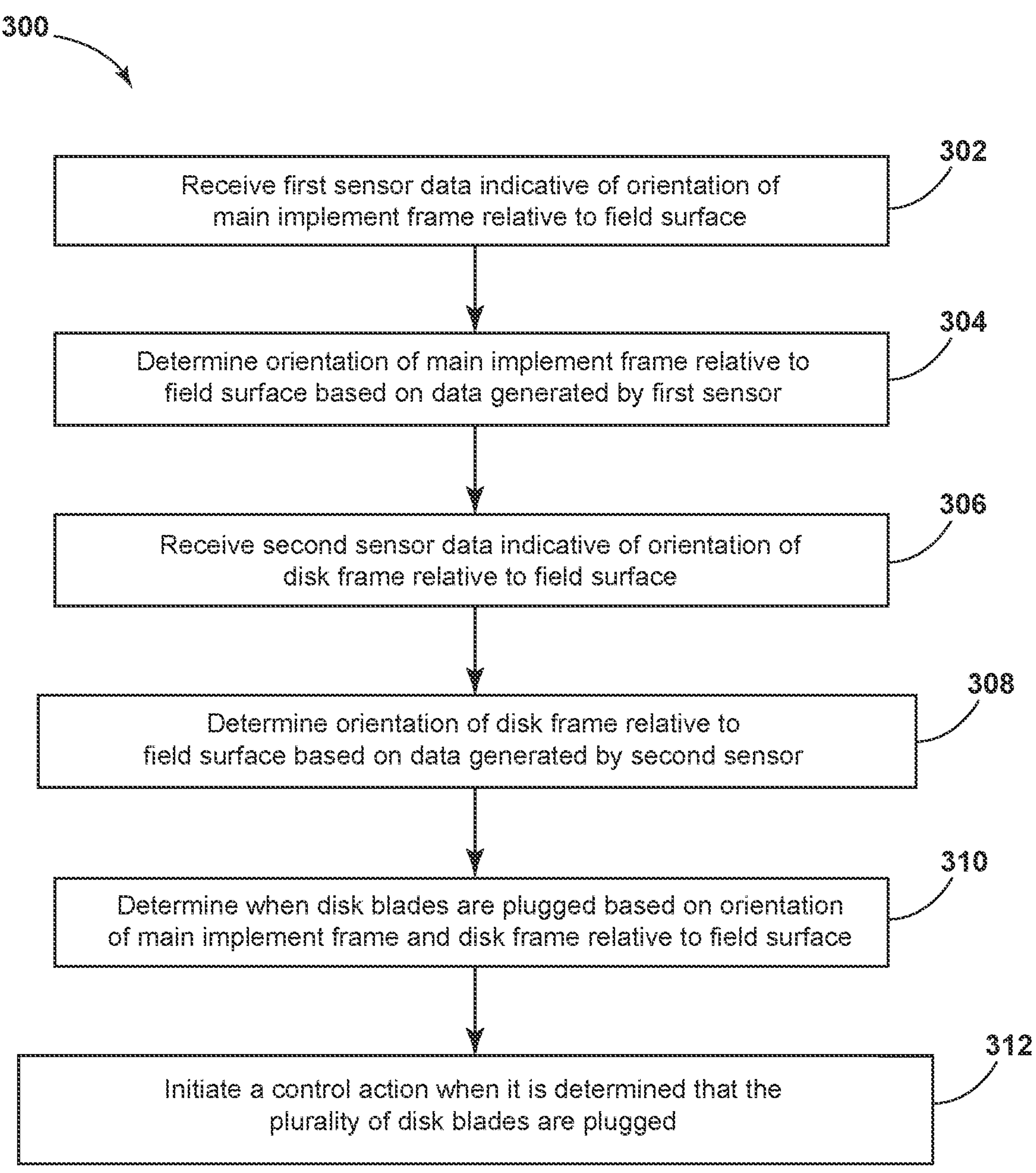
FIG. 7 illustrates a flow diagram of one embodiment of a method for detecting disk blade plugging on an agricultural implement in accordance with aspects of the present subject matter.

Referring now to FIG. 7, a flow diagram of one embodiment of a method 300 for detecting disk blade plugging on an agricultural implement is illustrated in accordance with aspects of the present subject matter. In general, the method 300 will be described herein with reference to the work vehicle 10, the agricultural implement 12, and the system 100 described above with reference to FIGS. 1-6. However, it should be appreciated by those of ordinary skill in the art that the disclosed method 300 may generally be implemented with any work vehicles having any suitable vehicle configuration, with agricultural implements having any suitable implement configuration, and/or within any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (302), the method 300 includes receiving, with a computing system, first sensor data indicative of an orientation of a main implement frame of an agricultural implement relative to a field surface. For instance, as described above, the computing system 106 may be configured to receive first sensor data from the first sensor(s) 102. Such first sensor data is, in turn, indicative of the orientation of the main implement frame 30 of the agricultural implement 12 relative to a field surface.

Furthermore, at (304), the method 300 includes determining, with the computing system, the orientation of the main implement frame relative to the field surface based on the received first sensor data. For instance, as described above, the computing system 106 may be configured to determine the orientation of the main implement frame 30 relative to the field surface based on then received first sensor data.

Additionally, as shown in FIG. 7, at (306), the method 300 includes receiving, with the computing system, second sensor data indicative of an orientation of the disk frame of the agricultural implement relative to the field surface. For instance, as described above, the computing system 106 may be configured to receive second sensor data from the second sensor(s) 104. Such second sensor data is, in turn, indicative of the orientation of the disk frame 40 of the agricultural implement 12 relative to a field surface Moreover, at (308), the method 300 includes determining, with the computing system, the orientation of the disk frame relative to the field surface based on the data generated by the second sensor 104. For instance, as described above, the computing system 106 may be configured to determine the orientation of the disk frame 40 relative to the field surface based on then received second sensor data.

In addition, as shown in FIG. 7, at (310), the method 300 includes determining, with the computing system, when the plurality of disk blades supported on the disk frame are plugged based on the determined orientation of the main implement frame relative to the field surface and the determined orientation of the disk frame relative to the field surface. For instance, as described above, the computing system 106 may be configured to determine when one or more disk blades 50 supported on the disk frame 40 are plugged based on the determined orientation of the main implement frame 30 relative to the field surface and the determined orientation of the disk frame 40 relative to the field surface.

Furthermore, at (312), the method 300 includes initiating, with the computing system, a control action when it is determined that the plurality of disk blades are plugged. For example, in several embodiment, the computing system 106 may be configured to initiate one or more control actions when it is determined that the disk blades 50 are plugged. Such control actions(s) may include notifying the operator that the disk blades 50 are plugged and/or adjusting a ground speed of the work vehicle 10.

It is to be understood that the steps of the control logic 200 and the method 300 are performed by the computing system 106 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 106 described herein, such as the control logic 200 and the method 300, is implemented in software code or instructions which are tangibly stored on a tangible computer readable medium. The computing system 106 loads the software code or instructions via a direct interface with the computer readable medium or via a wired and/or wireless network. Upon loading and executing such software code or instructions by the computing system 106, the computing system 106 may perform any of the functionality of the computing system 106 described herein, including any steps of the control logic 200 and the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A method for detecting plugging of an agricultural implement, the method comprising:

receiving, with a computing system, first sensor data indicative of an inclination of a main implement frame relative to a field surface;

receiving, with the computing system, second sensor data indicative of an inclination of a disk frame relative to a field surface;

determining, with the computing system, the inclination of the main implement frame relative to the field surface based on the received first sensor data;

determining, with the computing system, the inclination of the disk frame relative to the field surface based on the received second sensor data;

determining, with the computing system, when a plurality of disk blades supported on the disk frame are plugged based on the determined inclination of the main implement frame relative to the field surface and the determined inclination of the disk frame relative to the field surface; and adjusting, with the computing system, a ground speed of the agricultural implement in response to the determined inclination of the main implement frame relative to the field surface and the determined inclination of the disk frame relative to the field surface, wherein the determined inclination of the main implement frame relative to the field surface and the determined inclination of the disk frame relative to the field surface indicate that the plurality of disk blades are plugged.

2. The method of claim 1, further comprising:

determining, with the computing system, a difference between the determined inclination of the main implement frame and the determined inclination of the disk frame; and determining, with the computing system, that the plurality of disk blades are plugged when the determined difference between the determined inclination of the disk frame and the determined inclination of the main implement frame exceeds a predetermined threshold.

3. The method of claim 1, wherein the first sensor is positioned on the agricultural implement.

4. The method of claim 1, wherein the first sensor is positioned on a work vehicle configured to tow the agricultural implement across a field.

5. The method of claim 1, further comprising notifying an operator of the agricultural implement that the plurality of disk blades are plugged.

6. The method of claim 1, where the first sensor comprises a first inclinometer and the second sensor comprises a second inclinometer.

7. A system for detecting plugging of an agricultural implement, the system comprising:

a main implement frame;

a disk frame adjustably coupled to the main implement frame; and a plurality of disk blades supported on the disk frame;

a first sensor configured to generate data indicative of an inclination of the main implement frame relative to a field surface;

a second sensor configured to generate data indicative of an inclination of the disk frame relative to the field surface; and a computing system communicatively coupled to the first sensor and the second sensor, the computing system configured to:

determine the inclination of the main implement frame relative to the field surface based on the data generated by the first sensor;

determine the inclination of the disk frame relative to the field surface based on the data generated by the second sensor;

determine when the plurality of disk blades are plugged based on the determined inclination of the main implement frame relative to the field surface and the determined inclination of the disk frame relative to the field surface; and adjust a ground speed of the agricultural implement in response to the determined inclination of the main implement frame relative to the field surface and the determined inclination of the disk frame relative to the field surface, wherein the determined inclination of the main implement frame relative to the field surface and the determined inclination of the disk frame relative to the field surface indicate that the plurality of disk blades are plugged.

8. The system of claim 7, wherein the computing system is further configured to:

determine a difference between the determined inclination of the main implement frame and the determined inclination of the disk frame; and determine that the plurality of disk blades are plugged when the determined difference between the determined inclination of the disk frame and the determined inclination of the main implement frame exceeds a predetermined threshold.

9. The system of claim 7, wherein the first sensor is positioned on the agricultural implement.

10. The system of claim 7, wherein the first sensor is positioned on a work vehicle configured to tow the agricultural implement across a field.

11. The system of claim 7, further comprising notifying an operator of the agricultural implement that the plurality of disk blades are plugged.

12. The system of claim 7, wherein the first sensor comprises a first inclinometer and the second sensor comprises a second inclinometer.

13. An agricultural implement, comprising:

a main implement frame;

a disk frame adjustably coupled to the main implement frame;

a plurality of disk blades supported on the disk frame;

a first sensor configured to generate data indicative of an orientation of the main implement frame relative to a field surface;

a second sensor configured to generate data indicative of an orientation of the disk frame relative to the field surface; and a computing system communicatively coupled to the first sensor and the second sensor, the computing system configured to:

determine the orientation of the main implement frame relative to the field surface based on the data generated by the first sensor;

determine the orientation of the disk frame relative to the field surface based on the data generated by the second sensor;

determine a difference between the determined orientation of the main implement frame and the determined orientation of the disk frame;

determine that the plurality of disk blades are plugged when the determined difference between the determined orientation of the disk frame and the determined orientation of the main implement frame exceeds a predetermined threshold; and adjust a ground speed of the agricultural implement in response to the determined difference between the determined orientation of the disk frame and the determined orientation of the main implement frame exceeding a predetermined threshold.

14. The agricultural implement of claim 13, further comprising notifying an operator of the agricultural implement that the plurality of disk blades are plugged.

* * * * *